Aug. 5, 1947.
R. D. SNYDER ET AL
2,425,209
SEAT FOR MECHANICAL SEALS
Filed Aug. 31, 1944
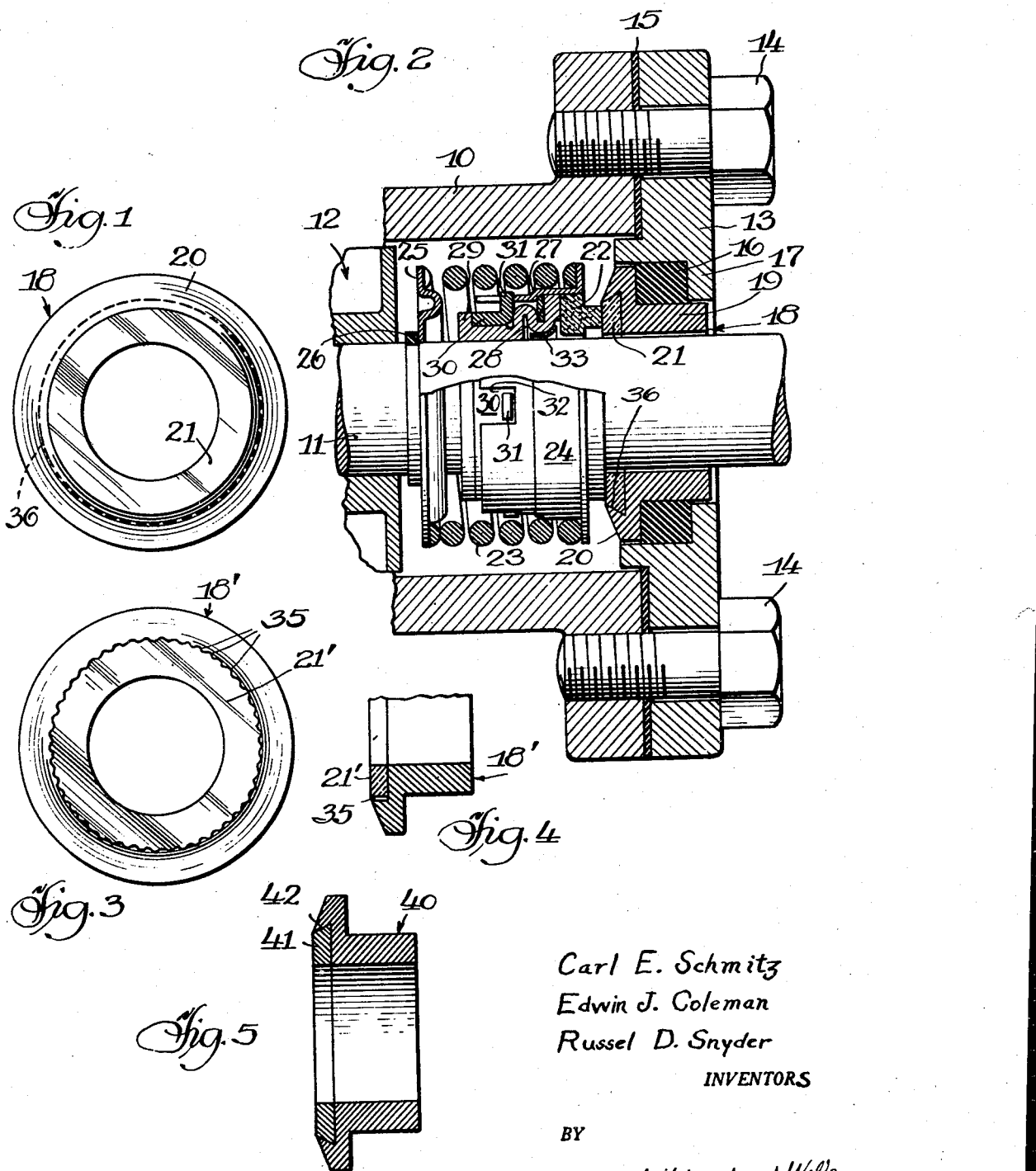
Carl E. Schmitz
Edwin J. Coleman
Russel D. Snyder
INVENTORS
BY
Zabel, Carlson, Geitzbaugh and Wells
Attys.

Patented Aug. 5, 1947

2,425,209

UNITED STATES PATENT OFFICE 2,425,209

SEAT FOR MECHANICAL SEALS

Russel D. Snyder, Edwin J. Coleman, and Carl E. Schmitz, Chicago, Ill., assignors to Crane Packing Company, Chicago, Ill., a corporation of Illinois Application August 31, 1944, Serial No. 552,094

4 Claims. (Cl. 288—1)

1

This invention relates to seals for use in connection with a rotatable shaft or other part, and in particular, a seal which embodies as one of its cooperating parts, a molded seat body with a hard, lapped bearing and sealing surface.

Sealing devices have been developed heretofore for use in centrifugal water pumps and analogous equipment wherein it is necessary to prevent leakage of liquid or gas between relatively rotatable parts, such as the rotating shaft and the bearing in the pump housing. Such seals comprise, generally speaking, two rings concentric with the shaft, one fixed against rotation in the housing, and the other rotatable with said shaft. These rings have smooth, hard anti-friction bearing surfaces or side faces which engage each other and which preferably are out of contact with the shaft, but which are spring pressed toward each other to prevent leakage of liquid or gas into or out of the space immediately surrounding said shaft. The rotatable ring may be in the form of a washer of carbon, bronze, compressed powdered metal, or some special composition such as those known commercially as "Bakelite," "Morganite" and "Teeplelite," etc. The stationary ring, hereinafter referred to as the seat, and which is engaged by the rotatable ring, has generally been made of a harder material such as cast iron, Stellite, stainless steel, and the like, the important characteristic being that that seat be capable of taking a hard, plane surface, and of maintaining such surface even though subjected to severe local temperature conditions due to friction.

In some cases, the relative arrangement can be reversed, and the softer material is the non-rotatable element and constitutes the seat. In either case, the engaging surfaces of the seats and of the washers are usually ground and lapped to constitute an effective seal when one rotates relatively to the other.

In certain instances, the seat is received into a recess in a stationary part, as for example, in the housing of a pump, by a press fit. In such instances, the seat must be made of material which will take machining to close dimensions. In other instances, there is provided a yielding resilient gasket such as rubber or the like, behind the seat to permit the same to adjust itself to a plane exactly at rght angles to the axis of rotation, thus providing for a slight misalignment of certain parts without resultant leakage. Under these conditions, it is not necessary to provide for a press fit between the seat and the pump housing, or the like. However, even in the latter case, the outside dimensions of the seat are generally held to a tolerance of within .005 inch.

Similarly the inner dimensions of the seat, although it is designed to clear the shaft, are desirably held to within comparable tolerances. The result is that even though a so-called floating seat construction is adopted, the manufacture of the seat requires a machining operation, in addition to the grinding and lapping of the bearing surface.

Seals of this general character are referred to as mechanical seals. Some of them operate under high temperature conditions, as for example, in boiler feed pumps where the temperature may be as high as 400° F. In other instances, the seals are expected to withstand pressures up to 800 pounds per square inch. In still other instances, the seals are required to operate in the presence of corrosive liquids, such as sea water, acids, or alkalies.

The principal object of this invention is to provide an improved type of seat for a mechanical seal in which the composition of the bearing surface may be selected primarily with regard to the type of use to which the seal is subjected, and in which the expense of machining the selected composition, or in which the difficulties of adapting a particular composition to a given mechanical environment are only of secondary importance.

As an example of the practical difficulties which one encounters, it can be stated that carbon against bronze constitutes a commonly used pair of bearing surfaces. However, this pair wears very poorly in water. Carbon against cast iron is considerably better, and carbon against porcelain, steatite, or certain other types of ceramic material is still better, this latter pair having a life of about twenty times the life of carbon against bronze, in a water environment. However, certain practical considerations prevent the use of cast iron. For instance, cast iron is subject to corrosion. As far as a ceramic composition is concerned, to our knowledge it has never been used commercially in a seat, and this is doubtless due to the difficulty and expense of manufacturing a ceramic article to any degree of tolerance which is comparable to that used in the machine arts.

Another object is to provide a seat for a mechanical seal which is in the form of a molded article, and which is provided with an insert which can be ground and lapped to provide an effective bearing and sealing surface. In general, the seat may be formed from a suitable molding material and the insert may be of any satisfactory bearing substance.

A further object of this invention is to provide a seat which can be inexpensively manufactured to reasonably close tolerances from a substantially non-corrosive molding material, and to provide such seat with a bearing surface in the form of an insert which is molded in situ. The necessary grinding and lapping can be effected after the article as a whole is molded, thereby assuring a bearing and sealing surface which is perpendicular to the axis of the seat.

It is a still further object to provide a floating seat wherein the body portion and the flanges which engage the resilient mounting may be selected from a group of materials which are adapted to withstand the continued strain and vibration imparted to it by the cooperating washer, and in which the bearing surface may be selected from a suitable group of materials not necessarily possessing these properties.

Other objects, features and advantages of this invention will become apparent as the description proceeds.

With reference now to the drawings which form a part of this specification, and in which like reference numerals designate like parts:

Fig. 1 is an elevation of a preferred embodiment of this invention;

Fig. 2 is a section through a rotating shaft assembly embodying that preferred embodiment which is shown in Fig. 1;

Fig. 3 is a modified form of this invention;

Fig. 4 is a partial section along line 4—4 of Fig. 3; and

Fig. 5 is a section of a still further modified form of this invention.

The structure selected for illustration may be assumed to be a centrifugal pump, the end portion of the housing 10 having a suitable bearing, not shown, for a pump shaft 11. Any suitable form of impeller 12 having the usual blades or vanes thereon is fixed to the shaft 11 to rotate therewith.

An apertured plate or gland 13 is nonrotatably secured to the housing 10 by suitable means such as cap screws 14, a gasket 15 being interposed between the adjacent surfaces to prevent leakage of fluid pressure. A ring 16 of rubber or of other yieldable waterproof material, is seated against a shoulder formed by an inwardly extending annular flange 17 on the plate 13. The seat 18 which forms the preferred embodiment of this invention comprises a body portion 19 which is disposed within the rubber ring 16 and extends into the apertured plate 13, the body portion being provided with a flange 20 which bears against the end face of the rubber ring 16.

The body portion 19 and flange 20 are formed from a suitable molding material. The term "molding material" refers to any substance which can be formed into an article of the desired shape, finish and dimensions by a molding operation. Examples of such substances are thermosetting compounds, cold mold compounds, powdered metal compounds and die castings. The selection of a particular molding material is made with regard to the mechanical and chemical properties thereof. For instance, among thermosetting compounds, a phenolic might be used in a saline or acidic environment, while melamine would be used in a basic environment. Cold mold compounds would be desirable where heat resistance is an important factor, and certain powdered metal compounds or die castings would be desirable where mechanical strength is to be considered.

The seat 18 also embodies a ring-shaped insert 21 which is molded in situ, and is shown in Fig. 2 as being made from a suitable ceramic, such as steatite. Cooperating with seat 18 is a washer 22 which may be formed of pressed and sintered carbon, or of other suitable material which provides a lapped mating surface. It will be understood that the bearing surface of the insert 21 has been ground and lapped to approximate a true plane surface with that degree of accuracy which is required for mechanical seals of this character.

The washer 22 is held against seat 18 by means of a helical spring 23, the latter being confined between spring seats 24 and 25. The position of the latter spring seat is determined by a retaining ring 26 which is set into an annular groove in the shaft 11. Spring seat 24, the one at the right hand end of the spring, as viewed in Fig. 2, is generally tubular in shape, but is provided with a flange for engagement by the spring 23. The tubular portion of the spring seat 24 is provided with a shoulder 27, formed by an offset, against which shoulder is disposed a washer 28. A rubber sleeve 29 is disposed around the shaft, the right hand end of which extends outwardly and is confined between the washer 28 and the washer 22. A clamping ring 30 surrounds the left hand end of the rubber sleeve 29 and serves to clamp this end to the shaft, the purpose of this construction being to prevent leakage through the joint between the rubber sleeve 29 and the shaft 11. The clamping ring 30 is provided with projections 31 which extend through slots 32 in the left hand end of the spring seat 24, and interlock therewith to insure rotation of the clamping ring 30 with the spring seat 24.

It will be noted that the length of the rubber sleeve is greater than the distance between the clamping ring and the washer 21 so as to cause a fold in the sleeve. This permits a certain amount of longitudinal motion of the spring seat 24 and the washer 22 with respect to the shaft, without in any way breaking the seal. An annular separator 33 is disposed within the rubber sleeve 29 to prevent contact with the shaft 11 at this point.

In operation it will be seen that the rubber sleeve 29 prevents any leakage of water into the space between the washer 21 and the shaft 11, but still permits that flexibility which is desirable in maintaining an effective seal between the washer 22 and the seat 18.

The insert 21 may be molded from the suitable ceramic material and then fired. This firing results in a shrinkage, and possibly a certain amount of warping, but this does not detract from the value of the seal, inasmuch as the dimensions of the insert are not critical. The grinding and lapping of the sealing surface is done after the seat 18 has been molded, so that any irregularities originally in the insert 21 do not affect the utility of the finished article.

In Figs. 3 and 4 are shown a modified form in which the ceramic insert 21' is provided with a knurled edge 35, rather than the flaring edge 36 provided in the insert 21. Otherwise, the seat, designated generally by the reference numeral 18', is substantially the same as seat 18. The advantages of the knurled edge 35 in seat 18' arise primarily in the manufacture of the insert 21'. The knurled edge permits the ceramic to be extruded, then cut off into washers of appropriate thickness, and then fired. The insert 21, on the other hand, must be molded, which is a more costly operation.

In Fig. 5 is shown a further modification in which the seat 40 is provided with a cast iron insert 41. The edge 42 of the insert 41 may be flared somewhat like the edge 36 of insert 21. After molding the seat 40, with the insert in place, the exposed surface of the insert 41 may be ground and lapped in the usual manner.

The ceramic and cast iron sealing surfaces above referred to give excellent results when paired with either a carbon washer, as above mentioned, or with a washer made of Teeplelite. Teeplelite is characterized by a resinous binder and a filler of short fiberized asbestos, and also incorporates powdered lead, powdered antimony and natural flake graphite, these latter ingredients imparting a self-lubricating characteristic to the seal.

Although for a general purpose seat it has been found that the composition of the molded portion of the seat may preferably comprise a phenolic resin and a filler of asbestos fiber, it is obvious that this composition can be varied considerably. Other resinous binders are equally sutable, and as pointed out above, may be preferable in special chemical environments. However, in selecting the binder and the filler it should be kept in mind that the thin connecting wall sections in the vicinity of the flange 20 would have a tendency to break if made of weak material; therefore, a composition having comparatively high impact tensile and flexural strength is desirable.

Also another important consideration in the selection of a molding material is shrinkage. Materials having either a low shrinkage or a predictable shrinkage are desirable. As pointed out above the objections to a ceramic seat is that its shrinkage is of such a great extent that it is not predictable. However, it might be that a ceramic having a predictable shrinkage would be developed, even though it did not have the necessary qualities as a bearing and sealing surface. In such an instance, of course the body portion of the seat could be made from such a ceramic and the proper insert could be molded in situ.

One of the advantages of the seat herein disclosed is that it permits the use of sealing surfaces of various types of brittle material, other than ceramic or cast iron. For instance, sintered carbon is exceedingly brittle and could well be molded into a seat of the character described, as an insert.

Furthermore, in some instances, it is desirable to use a pair of sealing surfaces one of which consists of or embodies a precious metal, such as silver. Obviously a molded seat such as herein shown and described is much more practical than the seat made entirely from precious metal.

Other examples of suitable materials for the insert are Stellite and stainless steel. Both of these, especially the former, are very difficult to machine so that the economy in adopting the construction herein disclosed is obvious.

By using the seat construction herein shown it will be obvious that a much greater selection of pairs of sealing surfaces is available than if one's choice were confined to those pairs of which the composition of one of the elements had to be determined by the requirements of the mechanical environment.

More specifically, the seat 18, having a ceramic sealing surface, has been found to give a much longer life in a water medium, and is particularly advantageous in saline and acidic solutions.

Although only preferred embodiments of this invention have been shown and described herein, it will be understood that various modifications and changes may be made without departing from the spirit of this invention. The foregoing description and drawings are deemed to be illustrative only, and this invention is to be limited only by the appended claims.

We claim:

1. A seat for a mechanical seal comprising a ceramic ring imbedded in a molded body member, the side surface of said ceramic ring being in an exposed positon and being ground and lapped to approximate a coplanar surface, and another surface having projections thereon extending into the body member to prevent relative rotation between the ring and body member.

2. A seat for a mechanical seal comprising a ceramic ring imbedded in a molded member, the side surface of said ceramic ring being in an exposed position and being ground and lapped to approximate a coplanar surface, and the peripheral edge of which ring is knurled.

3. A seat for a rotary seal, said seat comprising a flexible support having finished surfaces, a ring of quadrilateral radial cross-section having one surface finished to form a running surface for the seal, and a holder for the ring, said holder being made from thermosetting material which is shrunk upon the ring to form a fluid-tight seal between the ring and holder, said holder being finished to have a press-fit on the flexible support and said holder covering the surfaces of the ring between the running surface and the support.

4. A seat for a rotary seal adapted to seal a corrosive fluid, said seat comprising a flexible support, a ring of material which is readily corrodible by said fluid, said ring having a surface which is finished to form a running surface for the seal, and a holder for the ring, said holder being made of a thermosetting material which is not readily corrodible by the said fluid, said holder being mounted on the support and covering the surfaces of the ring between the running surface and the support.

RUSSEL D. SNYDER.
EDWIN J. COLEMAN.
CARL E. SCHMITZ.

REFERENCES CITED

The following references are of record in the file of this patent:

UNITED STATES PATENTS

| Number | Name | Date |
|---|---|---|
| 1,756,323 | Wilfley | Apr. 29, 1930 |
| 1,980,082 | Avington | Nov. 6, 1934 |
| 2,250,621 | Bordeaux | July 29, 1941 |
| 2,362,363 | Doede | Nov. 7, 1944 |
| 941,605 | Baekeland | Nov. 30, 1909 |
| 1,820,100 | Thompson | Aug. 25, 1931 |
| 1,862,887 | Durdin | June 4, 1932 |
| 2,202,717 | Penn | Aug 27, 1940 |

FOREIGN PATENTS

| Number | Country | Date |
|---|---|---|
| 159,255 | Great Britain | 1921 |